(12) United States Patent
Maehiro

(10) Patent No.: US 6,880,168 B2
(45) Date of Patent: Apr. 12, 2005

(54) CHAT APPLICATION FOR VIDEO GAME MACHINE

(75) Inventor: Kazutoyo Maehiro, Tokyo (JP)

(73) Assignee: Kabushiki Kaisha Square Enix, Tokyo (JP)

(*) Notice: Subject to any disclaimer, the term of this patent is extended or adjusted under 35 U.S.C. 154(b) by 794 days.

(21) Appl. No.: 09/820,565

(22) Filed: Mar. 29, 2001

(65) Prior Publication Data

US 2002/0061779 A1 May 23, 2002

(30) Foreign Application Priority Data

Nov. 17, 2000 (JP) .................................... 2000-351912

(51) Int. Cl.[7] .......................... H04N 7/173; G06F 15/16; H02M 1/12
(52) U.S. Cl. ............................ 725/97; 725/86; 725/96; 709/204; 709/203; 363/1; 363/42; 363/43
(58) Field of Search ............................... 709/204, 203; 725/86, 96, 97; 363/1, 42, 43

(56) References Cited

U.S. PATENT DOCUMENTS

| | | | |
|---|---|---|---|
| 5,586,937 A | * 12/1996 | Menashe | 463/41 |
| 5,689,641 A | 11/1997 | Ludwig et al. | 395/200.02 |
| 5,758,079 A | 5/1998 | Ludwig et al. | 395/200.34 |
| 5,796,393 A | 8/1998 | MacNaughton et al. | 345/329 |
| 5,802,294 A | 9/1998 | Ludwig et al. | 395/200.34 |
| 5,854,893 A | 12/1998 | Ludwig et al. | 395/200.34 |
| 5,867,654 A | 2/1999 | Ludwig et al. | 395/200.34 |
| 5,896,500 A | 4/1999 | Ludwig et al. | 395/200.34 |
| 5,915,091 A | 6/1999 | Ludwig et al. | 395/200.34 |
| 6,012,984 A | * 1/2000 | Roseman | 463/42 |
| 6,050,898 A | * 4/2000 | Vange et al. | 463/42 |
| 6,203,433 B1 | * 3/2001 | Kume | 463/42 |
| 6,241,612 B1 | * 6/2001 | Heredia | 463/42 |

FOREIGN PATENT DOCUMENTS

| | | |
|---|---|---|
| JP | 7-135530 | 5/1995 |
| JP | 08-163524 | 6/1996 |
| JP | 8-256145 | 10/1996 |
| JP | 08-297637 | 11/1996 |
| JP | 9-81489 | 3/1997 |
| JP | 2002-157206 | 5/2002 |
| WO | 98/20410 | 5/1998 |
| WO | 00/52887 | 9/2000 |

OTHER PUBLICATIONS

Gall et al., "Promondia: A Java–Based Framework for Real–Time Group Communication in the Web", Computer Networks and ISND Systems, vol. 29, No. 8–13, 1997, pp. 917–926.

"Easy Communication is All the Rage. Go with Instant Message!," Internet Magazine, Impress Corp., No. 58, pp. 206–221 Nov. 1, 1999, together with a partial English language translation of the same.

Makino et al., "Up–to–date Situation: Cool Internet Life," Mac Fan Internet, Mainichi Communications Inc., vol. 3, No. 12, pp. 22–31, Dec. 1, 1998, together with a partial English language translation of the Same.

English Language Abstract of JP 9–81489, Published Mar. 28, 1997.

English Language Abstract of JP 2002–157206, Published May 31, 2002.

* cited by examiner

*Primary Examiner*—Krisna Lim
(74) *Attorney, Agent, or Firm*—Greenblum & Bernstein, P.L.C.

(57) ABSTRACT

The present invention allows users to open and join a chat by means of a simple procedure from a video game machine, the present invention includes creating an opening message for opening an electronic conference and creating an opening request signal for setting an area in a database, based on the opening message. Also included is transmitting the opening request signal to the database and creating an invitation message prompting particular users to join the electronic conference, based on the opening message. Finally, the present invention further includes transmitting the invitation signal to the particular users.

34 Claims, 9 Drawing Sheets

FIG.4A

| HEADER | | |
|---|---|---|
| USER NAME | | 401 |
| USER ID | | 402 |
| USER PASSWORD | | 403 |
| COMMAND | CHAT OPENING REQUEST | 411 |
|   CHAT NAME | A B C | 412 |
|   CHAT PASSWORD | * * * * | 113 |

| HEADER | | |
|---|---|---|
| USER NAME | | 401 |
| USER ID | | 402 |
| RESPONSE | CHAT OPENING RESPONSE | 421 |
|   CHAT NAME | A B C | 412 |
|   CHAT PASSWORD | * * * * | 413 |
|   CHAT ID | ####-## | 422 |
| MESSAGE | | 423 |
|   ×× | | |
|   ××× | | |
|   ⋮ | ⋮ | |

204

| HEADER | |
|---|---|
| USER NAME | | ~401
| USER ID | | ~402
| USER PASSWORD | | ~403
| COMMAND | ENTER ROOM | ~601
|    CHAT NAME | A B C | ~412
|    CHAT PASSWORD | * * * * | ~413
|    CHAT ID | ####-## | ~422

| HEADER | |
|---|---|
| USER NAME | |
| USER ID | |
| COMMAND | INVITATION |
|    CHAT NAME | A B C |
|    CHAT PASSWORD | * * * * |
|    CHAT ID | ####-## |
| MESSAGE | |
|    TITLE | |
|    ×××  | |
|    ⋮ | ⋮ |

FIG.8

CHAT APPLICATION FOR VIDEO GAME MACHINE

This application is based on Patent Application No. 2000-351912 filed Nov. 17, 2000 in Japan, the content of which is expressly incorporated hereinto by reference in its entirety.

BACKGROUND OF THE INVENTION

1. Field of the Invention

The present invention relates to a method and apparatus for opening an electronic conference, and particularly to a method and apparatus for opening an electronic conference by means of a simple procedure from a video game machine.

2. Description of the Related Art

Video game machines with an Internet connection function can receive various services via servers of ISPs (Internet Service Providers). With these new services, for example, game software is distributed to video game machines and users can play battle games via the network. On the other hand, further new services can be provided by combining services relating to games with services such as electronic mail and conferences (hereafter referred to as "chats") which are conventionally provided on the Internet.

In a battle game, users playing the game via a network may be opponents or allies. If users who have come to know each other through a game have means for communication, they can exchange information on games to enjoy such games more. Further, if not only one-on-one battle games but also games that can be joined by many players are available, information exchanged based on chats are effective.

A problem with conventional video game machines, however, is that they have the Internet connecting function but no application program for electronic mail or chats, thus requiring a separate general-purpose computer to be used in order to send electronic mail or have chats.

Another problem is that opening a chat requires various procedures with an ISP, which are cumbersome both to a chat chairman and to guests.

SUMMARY OF THE INVENTION

It is an object of the present invention to provide a method and apparatus for opening an electronic conference which method and apparatus allow users to open and join a chat by means of a simple procedure from a video game machine.

To attain this object, a first aspect of the invention includes a method for opening an electronic conference by sending a request for an area set on a database to a server from a user's terminal, in order to hold the electronic conference using this area. The method includes creating and transmitting an opening request signal for setting the area to the server and receiving an opening response signal containing opening information indicating that the area has been set in the database based on the opening request signal. The method also includes creating an invitation signal containing the opening information contained in the opening response signal, and transmitting the invitation signal to users holding the electronic conference using the area.

The method may also includes creating an access request signal containing the opening information contained in the opening response signal, in order to access the area of the database, and transmitting the access request signal to the server.

In addition, the opening information may contain an ID number for allowing the server to identify the area of the database, the ID number being added to the access request signal.

The method may further include obtaining the opening information contained in the invitation signal, creating an access request signal containing the opening information, in order to access the area of the database, and transmitting the access request signal to the server. Moreover, the opening information may contain an ID number for allowing the server to identify the area of the database, the ID number being added to the invitation signal and to the access request signal.

According to another aspect of the invention, the method further includes receiving an input of an opening message containing setup information for setting the area, and storing the opening message in a storage section. The method also includes adding the setup information stored in the storage section to the invitation signal.

The method may also includes creating an access request signal containing the setup information stored in the storage section in order to access the area of the database and transmitting the access request signal to the server.

In addition, the method may include obtaining the setup information contained in the invitation signal, creating an access request signal containing the setup information, in order to access the area of the database, and transmitting the access request signal to the server. The setup information contains at least one of a name of the electronic conference or code number for accessing the area of the database.

The apparatus also includes opening an electronic conference by sending a request for an area set on a database to a server, in order to hold the electronic conference using this area. The apparatus includes an opening request signal transmitter that creates and transmits an opening request signal for setting the area to the server and a receiver that receives an opening response signal containing opening information indicating that the area has been set in the database based on the opening request signal. The apparatus also includes an invitation signal source that creates an invitation signal containing the opening information contained in the opening response signal received by the receiver, and an invitation signal transmitter that transmits the invitation signal created by the invitation signal source, to users holding the electronic conference using the area.

The apparatus may also include an access request signal source for creating an access request signal containing the opening information contained in the opening response signal received by the receiver, in order to access the area of the database, and an access request signal transmitter that transmits the access request signal to the server. The opening information may contain an ID number for allowing the server to identify the area of the database, the access request signal source adds the ID number to the access request signal.

According to another aspect of the present invention, the apparatus also includes an opening information retriever that obtains the opening information contained in the invitation signal, an access request signal source that creates an access request signal containing the open information obtained by the opening information retriever, in order to access the area of the database, and an access request transmitter that transmits the access request signal to the server. The opening information may contain an ID number for allowing the server to identify the area of the database and the invitation signal source adds the ID number to the invitation signal. Moreover, that the access request signal source may add the ID number to the access request signal.

According to another aspect of the present invention, the apparatus further includes a message input device that receive an input of an opening message containing setup information for setting the area, and a storage that store the opening message. The invitation signal creating source may add the setup information stored in the storage to the invitation signal.

The apparatus may also include an access request signal source that creates an access request signal containing the setup information stored in the storage in order to access the area of the database and an access request signal transmitter that transmits the access request signal to the server.

The apparatus may also include a setup information retriever that obtains the setup information contained in the invitation signal, an access request signal source that creates an access request signal containing the setup information obtained by the setup information retriever, in order to access the area of the database, and an access request signal transmitter that transmits the access request signal to the server. The setup information may contain at least a name of the electronic conference or code number for accessing the area of the database.

According to another embodiment, a recording medium is provided having a program recorded thereon for controlling an apparatus for opening an electronic conference by sending a request for an area set on a database to a server, in order to hold the electronic conference using this area. The recording medium is readable by a computer and stores a program for allowing the computer to execute creating and transmitting an opening request signal for setting the area to the server. The computer also receives an opening response signal containing opening information indicating that the area has been set in the database based on the opening request signal, creates an invitation signal containing the opening information contained in the opening response signal, and transmits the invitation signal, to users holding the electronic conference using the area.

According to another aspect, the computer creates an access request signal containing the opening information contained in the opening response signal, in order to access the area of the database, and transmits the access request signal to the server. The opening information may contain an ID number for allowing the server to identify the area of the database the ID number being added to the access request signal.

According to another aspect, the computer may obtains the opening information contained in the invitation signal, create an access request signal containing the opening information, in order to access the area of the database, and transmit the access request signal to the server. In this aspect, the opening information may contain an ID number for allowing the server to identify the area of the database. The computer then adds the ID number to the invitation signal, and adds the ID number to the access request signal.

The computer may also receive an input of an opening message containing setup information for setting the area, store the opening message in a storage section and add the setup information stored in the storage section to the invitation signal.

The computer may also create an access request signal containing the setup information stored in the storage section in order to access the area of the database and transmit the access request signal to the server.

Moreover, the computer may obtain the setup information contained in the invitation signal, create an access request signal containing the setup obtained information, in order to access the area of the database, and transmitting the access request signal to the server. The setup information may contain at least a name of the electronic conference or code number for accessing the area of the database.

According to another embodiment, a program is provided for controlling an apparatus for opening an electronic conference by sending a request for an area set on a database to a server, in order to hold the electronic conference using this area. The program allows the computer to create and transmit an opening request signal for setting the area to the server, receive an opening response signal containing opening information indicating that the area has been set in the database based on the opening request signal, create an invitation signal containing the opening information contained in the opening response signal, and transmit the invitation signal, to users holding the electronic conference using the area.

As described above, the present invention allows users to open and join a chat with a simple procedure from a video game machine.

The above and other objects, effects, features and advantages of the present invention will become more apparent from the following description of embodiments thereof taken in conjunction with the accompanying drawings.

BRIEF DESCRIPTION OF THE DRAWING

FIGS. 4A and 4B are views showing examples of a signal format for opening a chat in the electronic conference opening according to the present invention;

FIG. 6 is a view showing an example of a data signal format for entering a chat in the electronic conference opening according to the present invention;

FIG. 8 is a view showing an example of a data signal format for invitation to a chat in the electronic conference opening according to the present invention.

DETAILED DESCRIPTION OF PREFERRED EMBODIMENTS

Embodiments of the present invention will be described below in detail with reference to the drawings.

Figure 1:
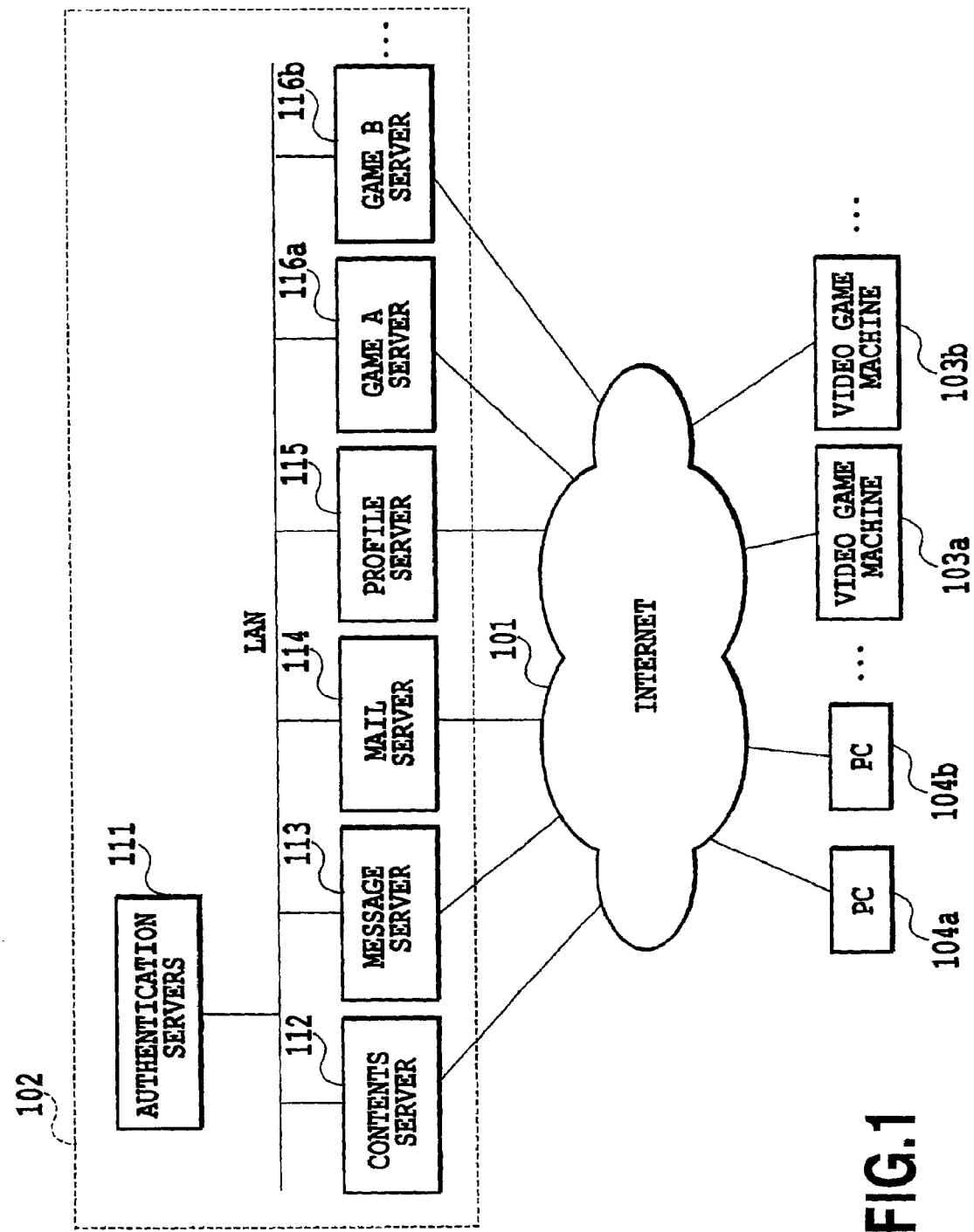
FIG. 1 is a schematic view showing an example of a system configuration for providing an electronic conference opening according to an aspect of the present invention.

FIG. 1 shows an example of a system configuration for providing an electronic conference opening according to the present invention. The Internet 101 has a server of an ISP, video game machine 103*a* and 103*b*, and general-purpose components 104*a* and 104*b* connected thereto.

The ISP servers 102 include an authentication server 111 for managing accounts to authenticate users, a content server 112 for providing services for allowing users to listen to and view contents such as sounds or videos, a message server 113 for providing environments for chats or messengers, a mail server 114 for providing electronic mail services, a profile server 115 for managing users' profiles, and game servers 116a and 116b for providing game environments. All these servers are connected to the ISP server via a LAN 117.

With this configuration, a user accesses the authentication server 111 from the video game machine 103a or 103b or the general-purpose computer 104a or 104b via the Internet 101, to have the user authenticated. The servers 102 transmit a menu screen to the authenticated user. The user selects one of services displayed on the menu screen to connect the video game machine 103a or 103b or the general-purpose computer 104a or 104b to one of the groups of servers depending on the service, so that the user can receive the service.

Figure 2:
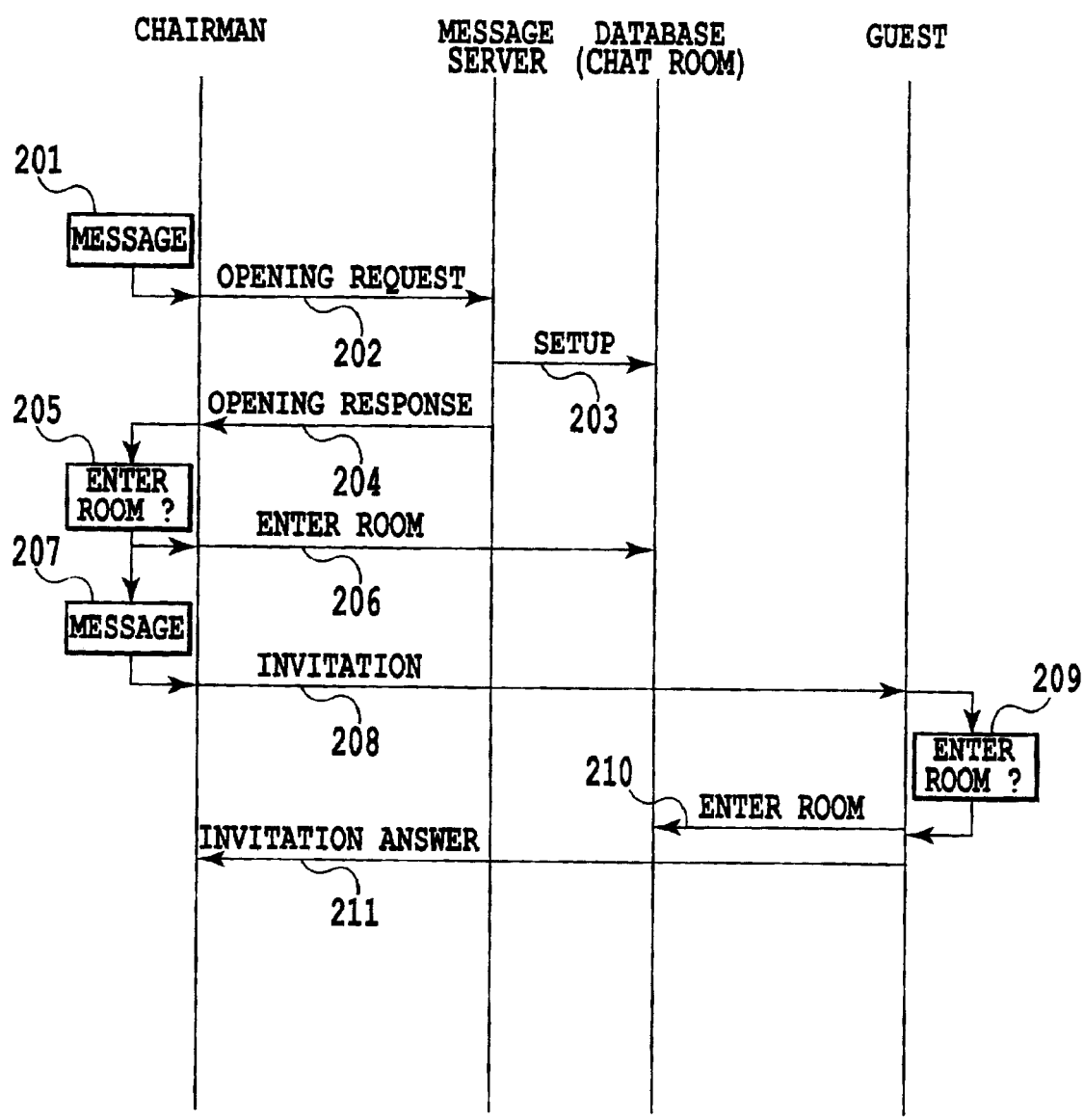
FIG. 2 is a sequence diagram showing an example of the electronic conference opening according to an aspect of the present invention.

FIG. 2 shows an example of the electronic conference opening of the present invention. A user who desires to open a chat, here the chairman, creates a message 201 for opening a chat, on the video game machine 103a. When this message is sent, a chat opening request signal 202 is transmitted to the message server 113. The latter transmits a setup signal 203 for opening the desired chat room to a database in the group of servers and returns a chat opening response signal 204 to the user. The opening of a chat refers to an operation performed by the message server 113 to set a specified area in the database and grant accesses only to particular users, that is, chat guests.

Upon receiving the chat opening response signal 204, the user's video game machine 103a displays a chat room setup list screen 205 showing how the chat room is set and prompting the user to enter the chat room newly set by the user. The user can enter (join) the chat room by transmitting an enter room signal 206 to the database. "an enter room signal " is a synonym of "an access request signal". The entry to a chat room refers to an operation of having the user's access checked by the group of message servers 113 to access a predetermined area of the database.

Further, a message 207 for invitation to the chat which is transmitted to the chat guests is displayed based on the created message 201, and an invitation signal 208 is transmitted to all the guests. The video game machine 103b of an expected guest receiving the invitation signal 208 displays a screen 209 prompting the guest to enter the chat room, and the expected guest can join the chat by transmitting a enter room signal 210 to the database. At this time, an invitation answer signal 211 indicating that the guest accepts the chairman's invitation is transmitted from the expected guest to the chairman. The invitation to a chat refers to an operation of granting a guest access to an opened chat room and prompting the guest to join the chat.

Figure 3:
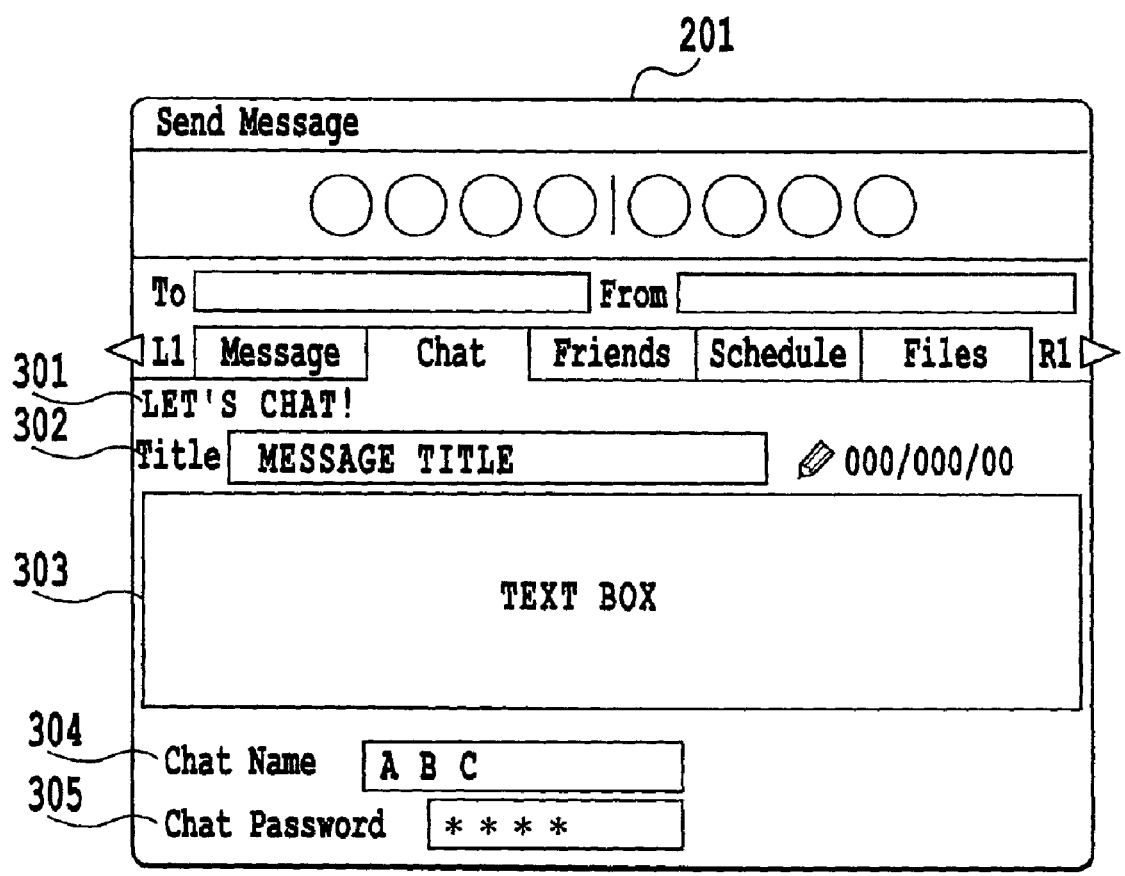
FIG. 3 is a view showing an example of a message for opening a chat in the electronic conference opening according to an aspect of the present invention.

FIG. 3 shows an example of a message for opening a chat in the electronic conference opening according to the present invention. This corresponds to the chat opening message 201 shown in FIG. 2 and is created and transmitted to the message server 113 by the chairman. The contents of the chat opening message 201 request the message server 113 to open the chat room and to transmit the invitation message to the expected guests.

The chat opening message 201 has a category 301 indicative of a type of message, a message title 302 and a text box 303 that are required to transmit the invitation message to the expected guests. The message 201 also has input fields for a chat name 304 and a chat password 305 which are required to request the group of message servers 113 to open the chat room. "a chat password" is a synonym of "a code number".

FIGS. 4A and 4B show examples of a chat opening data signal format in the electronic conference opening of the present invention. FIG. 4A corresponds to the chat opening request signal 202 shown in FIG. 2, and FIG. 4B corresponds to the chat opening response signal 204 shown in FIG. 2.

When the chairman creates the chat opening message 201 shown in FIG. 3 and gives an instruction to transmit this message, the video game machine 103a creates and transmits the chat opening request signal 202 to the message server 113. The video game machine 103a sets a user name 401, a user ID 402, and a user password 403 of the chairman which have already been registered, obtains a chat name 412 and a chat password from the contents of the chat opening message 201, and generates and transmits a "chat opening request" command 411.

Upon receiving the chat opening request signal 202, the message server 113 opens a chat room in the database, that is, secures a predetermined area, and determines a chat ID. Upon finishing the opening operation, the message server 113 creates and transmits the chat opening response signal 204 to the video game machine 103a. The contents of the chat opening response signal 204 include the user name 401, the user ID 402, the chat name 412 and chat password 413 derived from the chat opening response 421, which correspond to the contents of the chat opening request signal 202, as well as the chat ID 422 and the message 423. The chat ID 422 corresponds to the chat name 412 and the chat password 413 corresponds to an access for entering the chat room, i.e., accessing the predetermined area of the database.

Figure 5:
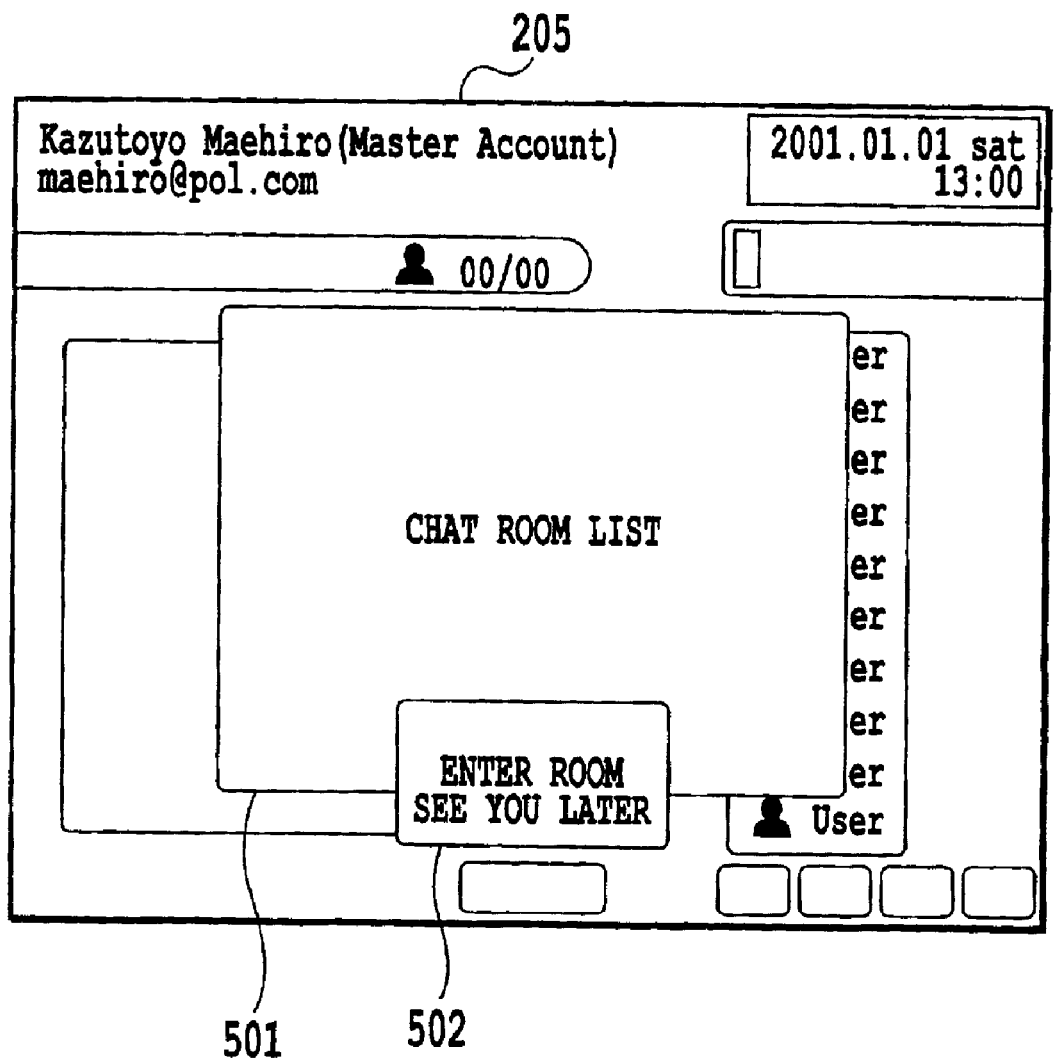
FIG. 5 is a view showing an example of a chat room setup list screen in the electronic conference opening according to the present invention.

FIG. 5 shows an example of a chat room setup list screen in the electronic conference opening according to the present invention. The chat room setup list screen 205 displays a list 501 showing currently open chat rooms. The list also displays the chat room opened by the chairman. Further, a selection screen 502 is also displayed, which prompts the chairman to enter the chat room. When the chairman selects "Enter Room", the video game machine 103a ends all the other applications, activates a chat application, and enters the chat room. When the chairman selects "See you later", the database of the group of message servers 113 leave the chat room set up.

FIG. 6 shows an example of a data signal format for entering a chat room in the electronic conference opening according to the present invention. This signal data format corresponds to the enter room signals 206 and 210 shown in FIG. 2. Here, the enter room signal 206 will be explained. When the chairman selects "Enter Room" in the selection screen 502 shown in FIG. 5, the video game machine 103a creates and transmits the enter room signal 206 to the database of the message server 113. The video game machine 103a sets the user name 401, user ID 402, and user password 403 of the chairman which have already been registered. An "Enter Room" command 601 is generated by obtaining the chat name 412 and the chat password 413 from the contents of the chat opening message 201 and obtaining the chat ID 422 from the contents of the chat opening response signal 204 shown in FIG. 4B.

Figure 7:
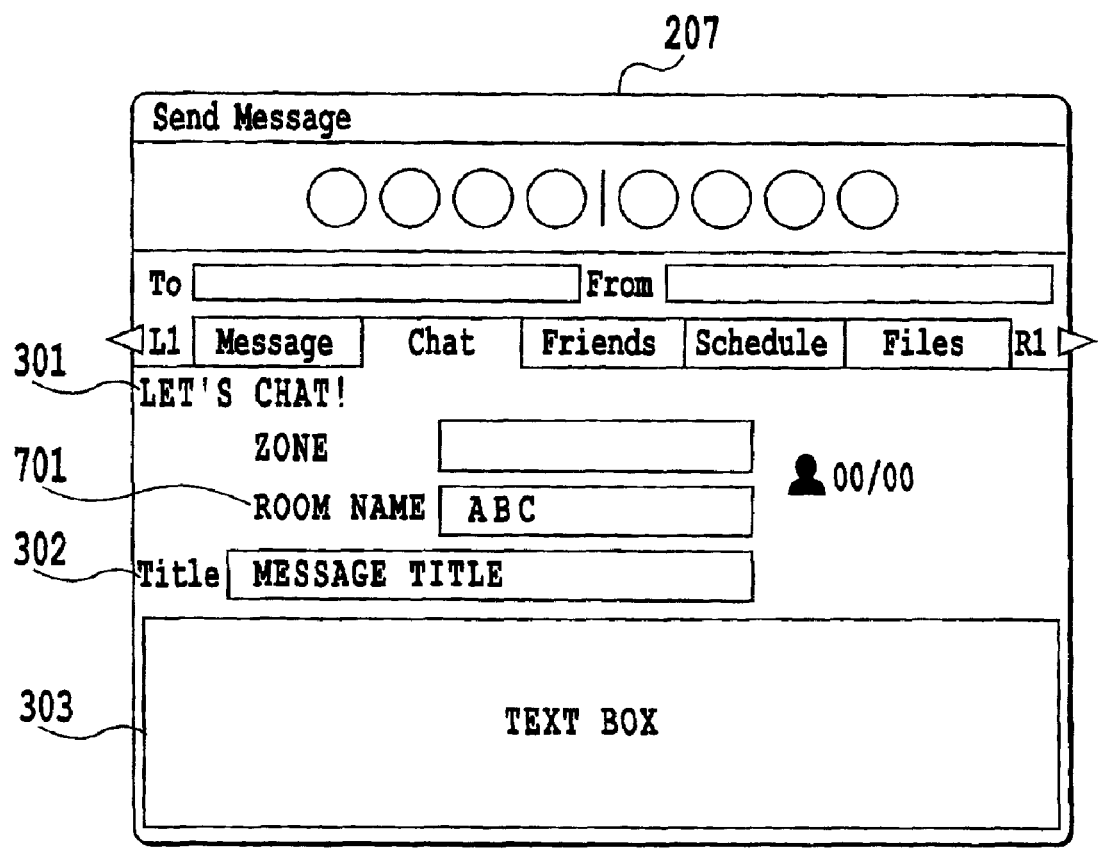
FIG. 7 is a view showing an example of a message for invitation to a chat in the electronic conference opening according to the present invention.

FIG. 7 shows an example of a message for invitation to a chat in the electronic conference opening of the present invention. This corresponds to the invitation message 207 shown in FIG. 2 and is created by the video game machine 103a based on the chat opening message 201 created by the chairman. The invitation message 207 differs from the chat opening message 201 shown in FIG. 3 in that the chat name 304 input through the chat opening message 201 is displayed as a room name 701 in the invitation message 207. The chat password 305 will be described later.

FIG. 8 shows an example of a data signal format for invitation to a chat in the electronic conference opening according to the present invention. This corresponds to the invitation message 208 shown in FIG. 2 and is created by the video game machine 103a based on the invitation message 207. The video game machine 103a sets the user name 401 and user ID 402 of the chairman which have already been registered. An "invitation" command 801 is generated by obtaining the chat name 304 and the chat password 305 from the contents of the chat opening message 201 and obtaining the chat ID 422 from the contents of the chat opening response signal 204 shown in FIG. 4B.

The chat password 413 is set by obtaining it from the chat password 305 of the chat opening message 201 but is not displayed in the invitation message 207 shown in FIG. 7. The chat ID 422 is also not displayed. Upon receiving the invitation message 207, the video game machine 103b displays the screen 209 prompting the guest to enter the chat room and creates the Enter Room signal 210 shown in FIG. 2. The screen 209 prompting the guest to enter the chat room also does not display the chat password 413 or the chat ID 422. That is, the chat password 413 and the chat ID 422 are recognized by the video game machines 103a and 104b during the exchange of the signals but are not communicated to the guests through the screen. When cumbersome procedures required to set a chat are thus omitted, users can open and join a chat by means of a simple procedure from a video game machine.

Figure 9:
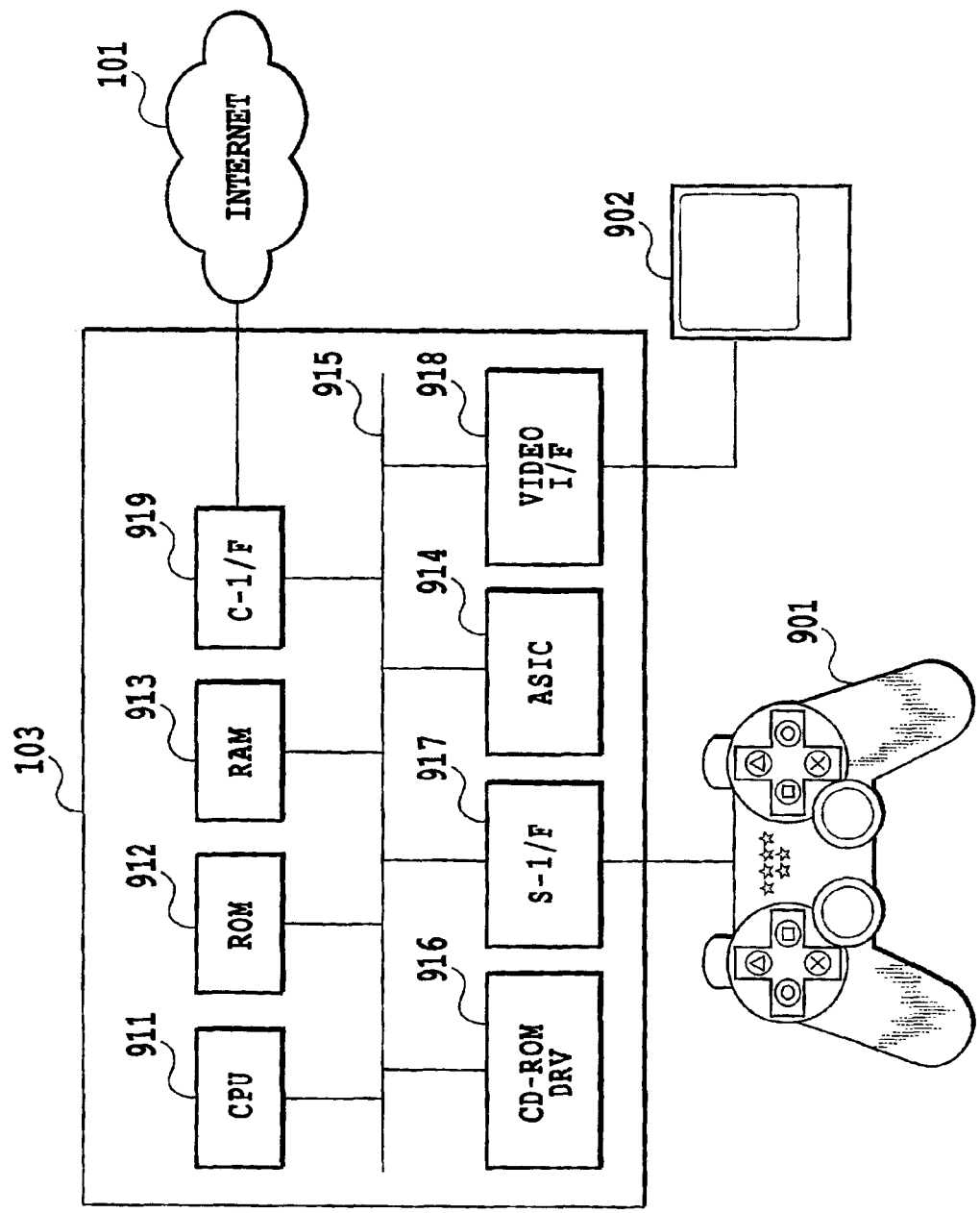
FIG. 9 is a block diagram showing an example of a video game machine having the electronic conference opening mounted therein.

FIG. 9 shows an example of a video game machine having the electronic conference opening ability according to the present invention. The video game machine 103 has a CPU 911 for controlling the entire machine, a ROM 912 storing game programs and a program for the electronic conference opening according to the present invention, a RAM 913 as a temporary storage area, and an Application Specific IC (ASIC) 914 for processing images, which are connected together via a bus 915.

A CD-ROM drive 916 for loading the game programs and the program for the electronic conference opening according to the present invention, from a CD-ROM storing these program is connected to the bus 915, a serial interface 917 connected to the game controller 901, a video interface 918 connected to a TV monitor 902, and a communications interface 919 for connecting to the Internet 101 are also connected to the bus 915.

Of course, the present invention is achieved by causing the video game machine or general-purpose computer to read and execute software program code from the storage medium storing the program code, the software implementing the electronic conference opening of the present invention. The storage medium for supplying the program code may include, for example, a floppy disk, a hard disk, a photo-electromagnetic disk, an optical disk, a CD-ROM, a CD-R, a magnetic tape, a non-volatile memory card, and a ROM.

The electronic conference opening of the present invention is also applicable not only to standalone general-purpose computers but also to a client server system includes a group of computers.

The present invention has been described in detail with respect to preferred embodiments, and it will now be apparent from the foregoing to those skilled in the art that changes and modifications may be made without departing from the invention in its broader aspects. It is the intention, therefore, in the appended claims to cover all such changes and modifications that fall within the true spirit of the invention.

What is claimed is:

1. A method for opening an electronic conference by sending a request for an area to be set on a database, the request being sent to a server from a user's terminal, and the request being sent in order to hold said electronic conference using said area, the method comprising:

creating and transmitting to said server an opening request signal for setting said area;

receiving an opening response signal comprising opening information indicating that said area has been set in said database based on said opening request signal;

creating an invitation signal comprising said opening information contained in the opening response signal; and transmitting said invitation signal to users being invited to hold said electronic conference using said area.

2. The method for opening an electronic conference according to claim 1, further comprising, creating an access request signal comprising said opening information contained in said opening response signal, in order to access said area of said database; and transmitting said access request signal to said server.

3. The method for opening an electronic conference according to claim 2, wherein said opening information comprises an ID for allowing said server to identify said area of said database, and the access request signal comprises said ID.

4. The method for opening an electronic conference according to claim 1, further comprising:

obtaining said opening information contained in said invitation signal;

creating an access request signal comprising said opening information, in order to access said area of said database; and transmitting said access request signal to said server.

5. The method for opening an electronic conference according to claim 4, wherein said opening information comprises an ID for allowing said server to identify said area of said database, wherein the creating the invitation signal further comprises adding said ID to said invitation signal and wherein the creating the access signal further comprises adding said ID to said access request signal.

6. The method for opening an electronic conference according to claim 1, further comprising:

receiving an input of an opening message comprising setup information for setting said area;

storing said opening message in a storage section; and adding said setup information stored in said storage section to said invitation signal.

7. The method for opening an electronic conference according to claim 6, wherein said setup information comprises at least one of a name of said electronic conference and a code number for accessing said area of said database.

8. The method for opening an electronic conference according to claim 6, further comprising:

creating an access request signal comprising said setup information stored in said storage section in order to access said area of said database; and transmitting said access request signal to said server.

9. The method for opening an electronic conference according to claim 8, wherein said setup information comprises at least one of a name of said electronic conference and a code number for accessing said area of said database.

10. The method for opening an electronic conference according to claim 6, further comprising:
obtaining said setup information contained in said invitation signal;
creating an access request signal comprising said setup information, in order to access said area of said database; and
transmitting said access request signal to said server.

11. The method for opening an electronic conference according to claim 10, wherein said setup information comprises at least one of a name of said electronic conference and a code number for accessing said area of said database.

12. An apparatus for opening an electronic conference by sending a request for an area to be set on a database to a server, the request being sent in order to hold said electronic conference using this area, the apparatus comprising:
an opening request signal transmitter that creates and transmits an opening request signal for setting said area to said server,
a receiver that receives an opening response signal comprising opening information indicating that said area has been set in said database based on said opening request signal;
an invitation signal source that creates an invitation signal comprising said opening information contained in said opening request signal received by said receiver; and
an invitation signal transmitter that transmits said invitation signal created by said invitation signal source, to users being invited to hold said electronic conference using said area.

13. The apparatus for opening an electronic conference according to claim 12, further comprising an access request signal source that creates an access request signal comprising said opening information contained in said opening response signal received by said receiver, in order to access said area of said database; and
an access request signal transmitter that transmits said access request signal to said server.

14. The apparatus for opening an electronic conference according to claim 13, wherein said opening information comprises an ID for allowing said server to identify said area of said database and said access request signal source adds said ID to said access request signal.

15. The apparatus for opening an electronic conference according to claim 12, further comprising an opening information retriever that obtains said opening information contained in said invitation signal;
an access request signal source that creates an access request signal comprising said open information obtained by said opening information retriever, in order to access said area of said database; and
an access request signal transmitter that transmits said access request signal to said server.

16. The apparatus for opening an electronic conference according to claim 15, wherein said opening information comprises an ID for allowing said server to identify said area of said database, and
wherein said invitation signal source adds said ID to said invitation signal and said access request signal source adds said ID to said access request signal.

17. The apparatus for opening an electronic conference according to claim 12, further comprising:
a message input device that receives an input of an opening message comprising setup information for setting said area, and
a storage that stores said opening message,
wherein said invitation signal source adds said setup information stored in said storage to said invitation signal.

18. The apparatus for opening an electronic conference according to claim 17, wherein said setup information comprises at least one of a name of said electronic conference and a code number for accessing said area of said database.

19. The apparatus for opening an electronic conference according to claim 17, further comprising:
an access request signal source for creating an access request signal comprising said setup information stored in said storage in order to access said area of said database; and
an access request signal transmitter that transmits said access request signal to said server.

20. The apparatus for opening an electronic conference according to claim 19, wherein said setup information comprises at least one of a name of said electronic conference and a code number for accessing said area of said database.

21. The apparatus for opening an electronic conference according to claim 17, further comprising a setup information retriever that obtains said setup information contained in said invitation signal;
an access request signal source that creates an access request signal comprising said setup information obtained by said setup information retriever, in order to access said area of said database; and
an access request signal transmitter that transmits said access request signal to said server.

22. The apparatus for opening an electronic conference according to claim 17, wherein said setup information comprises at least one of a name of said electronic conference and a code number for accessing said area of said database.

23. A recording medium having a program recorded thereon for controlling an apparatus for opening an electronic conference by sending a request for an area to be set on a database to a server, the request being sent in order to hold said electronic conference using the area, the recording medium being readable by a computer and storing a program for allowing the computer to execute:
creating and transmitting to said server an opening request signal for setting said area;
receiving an opening response signal comprising opening information indicating that said area has been set in said database based on said opening request signal;
creating an invitation signal comprising said opening information contained in said opening response signal; and
transmitting said invitation signal, to guests invited to said electronic conference using said area.

24. The recording medium according to 23, further comprising:
creating an access request signal comprising said opening information contained in said opening response signal, in order to access said area of said database; and
transmitting said access request signal to said server.

25. The recording medium according to 24, wherein said opening information comprises an ID for allowing said server to identify said area of said database and said ID is added to said access request signal.

26. The recording medium according to 23, further comprising:
obtaining said opening information contained in said invitation signal;

creating an access request signal comprising said opening information, in order to access said area of said database; and transmitting said access request signal to said server.

27. The recording medium according to 26, wherein said opening information comprises an ID for allowing said server to identify said area of said database, and wherein said ID is added to said invitation signal, and adding said ID is added to said access request signal.

28. The recording medium according to 23, further comprising:

receiving an input of an opening message comprising setup information for setting said area;

storing said opening message in a storage section; and adding said setup information stored in said storage section to said invitation signal.

29. The recording medium according to 28, wherein said setup information comprises at least one of a name of said electronic conference and a code number for accessing said area of said database.

30. The recording medium according to 28, further comprising:

creating an access request signal comprising said setup information stored in said storage section in order to access said area of said database; and transmitting said access request signal to said server.

31. The recording medium according to 30, wherein said setup information comprises at least one of a name of said electronic conference and a code number for accessing said area of said database.

32. The recording medium according to 28, further comprising:

obtaining said setup information contained in said invitation signal;

creating an access request signal comprising said setup information, in order to access said area of said database; and transmitting said access request signal to said server.

33. The recording medium according to 32, wherein said setup information comprises at least one of a name of said electronic conference and a code number for accessing said area of said database.

34. A program for controlling an apparatus for opening an electronic conference by sending a request for an area set on a database to a server, the request being sent in order to hold said electronic conference using this area, the program allowing said computer to execute:

creating and transmitting to said server an opening request signal for setting said area;

receiving an opening response signal comprising opening information indicating that said area has been set in said database based on said opening request signal;

creating an invitation signal comprising said opening information contained in said opening response signal; and transmitting said invitation signal, to users holding said electronic conference using said area.

\* \* \* \* \*